(12) United States Patent
Dasan et al.

(10) Patent No.: US 8,840,474 B1
(45) Date of Patent: Sep. 23, 2014

(54) SYSTEM AND METHOD FOR DISTRIBUTING GAMES RELATED TO TV PROGRAMS

(75) Inventors: Vasanthan Dasan, Boulder, CO (US); Jamey Ryan Wood, Louisville, CO (US); Michael Scott Gile, Pearland, TX (US)

(73) Assignee: Wayin, Inc., Burlingame, CA (US)

( * ) Notice: Subject to any disclaimer, the term of this patent is extended or adjusted under 35 U.S.C. 154(b) by 360 days.

(21) Appl. No.: 13/252,189

(22) Filed: Oct. 3, 2011

Related U.S. Application Data

(63) Continuation-in-part of application No. 13/198,706, filed on Aug. 4, 2011.

(51) Int. Cl.
*A63F 9/24* (2006.01)
(52) U.S. Cl.
USPC .......................................................... 463/40
(58) Field of Classification Search
USPC ..................................... 463/40, 1
See application file for complete search history.

(56) References Cited

U.S. PATENT DOCUMENTS

| | | | | |
|---|---|---|---|---|
| 2001/0003099 A1* | 6/2001 | Von Kohorn | ..................... | 463/40 |
| 2005/0196139 A1* | 9/2005 | Blackketter et al. | ............ | 386/46 |
| 2011/0212756 A1* | 9/2011 | Packard et al. | ................... | 463/1 |

* cited by examiner

*Primary Examiner* — Corbett B Coburn
(74) *Attorney, Agent, or Firm* — Lessani Law Group, PC

(57) ABSTRACT

A game distribution system and method identifies a television program a user is watching and provides the user with games related to the TV program. A client game-play enabled device obtains TV viewing information from a set-top box, smartTV, computer with IPTV, or other device capable of providing TV programming to a video display. The client game-play enabled device sends the TV viewing information to a game distribution server with a request for recommended games. The game distribution server identifies the TV program the user is watching and determines if there are any games related to the TV program. In response to determining that there are games related to the TV program, the server provides one or more of such games to the client device, and the client device presents TV-related games to the user in accordance with any time constraints associated with the games.

28 Claims, 18 Drawing Sheets

SYSTEM AND METHOD FOR DISTRIBUTING GAMES RELATED TO TV PROGRAMS

RELATED APPLICATIONS

This application is a continuation-in-part of U.S. patent application Ser. No. 13/198,706 filed on Aug. 4, 2011 and titled "System and Method for Distributing Games."

BACKGROUND OF THE INVENTION

1. Field of the Invention

This invention relates generally to a game distribution system, and, more particularly, to a game distribution system that enables users to create games for distribution to other users, as well as to subscribe to games from other users.

2. Description of the Background Art

Social media sites, such as FACEBOOK and TWITTER, enable users to post and share information. These sites are great forums for users to share information about themselves. However, these sites are not designed to allow users to create and share games with each other. Therefore, there is a need for systems that enables users to create and share games, as well as play games created by other users.

SUMMARY OF THE INVENTION

The present invention is directed to system and method for enabling users to create and share games, as well as "follow" other users to play games created by such other users. A game distribution system provides a user interface via which users can create games. Games are stored in association with the unique user ID of the person that created the game (the "game creator").

The game distribution system also provides a user interface via which users can subscribe to or "follow" other users to receive games created by such other users. When a user logs in or otherwise connects with the game distribution system, the system provides the user with one or more games from game creators to whom the user has subscribed.

In a further embodiment of the invention, the system also provides the user with "suggested games," which are games that the systems ascertains may be of interest to the user based in whole or in part on prior user activity, the user's profile, events in which the user is participating, and/or the location of the user. In addition, the system may provide the user with one or more games from a paid sponsor.

In one embodiment, a game is in the form of a multiple-choice question related to a photo. In such case, a user playing a game is presented with a photo, a question, and two or more answers options. When the user selects an answer, an indication of how other users answered is displayed to the user. The system may use information about the user's game play and interaction with the game distribution system to create a more detailed or accurate profile of the user.

In a further embodiment of the invention, the game distribution system identifies a television (TV) program a user is watching and provides the user with games related to the TV program. In this embodiment, a client game-play enabled device obtains TV viewing information from a set-top box, smartTV, computer with IPTV, or other device capable of providing TV programming. The client game-play enabled device sends the TV viewing information to a game distribution server with a request for recommended games. The game distribution server uses the TV viewing information to identify the TV program the user is watching. The server then determines if there are any games related to the TV program. In response to determining that there are games related to the TV program, the server provides one or more of such games to the client device, and the client device presents TV-related games to the user in accordance with any time constraints associated with the games.

DETAILED DESCRIPTION OF THE PREFERRED EMBODIMENTS

Figure 1:
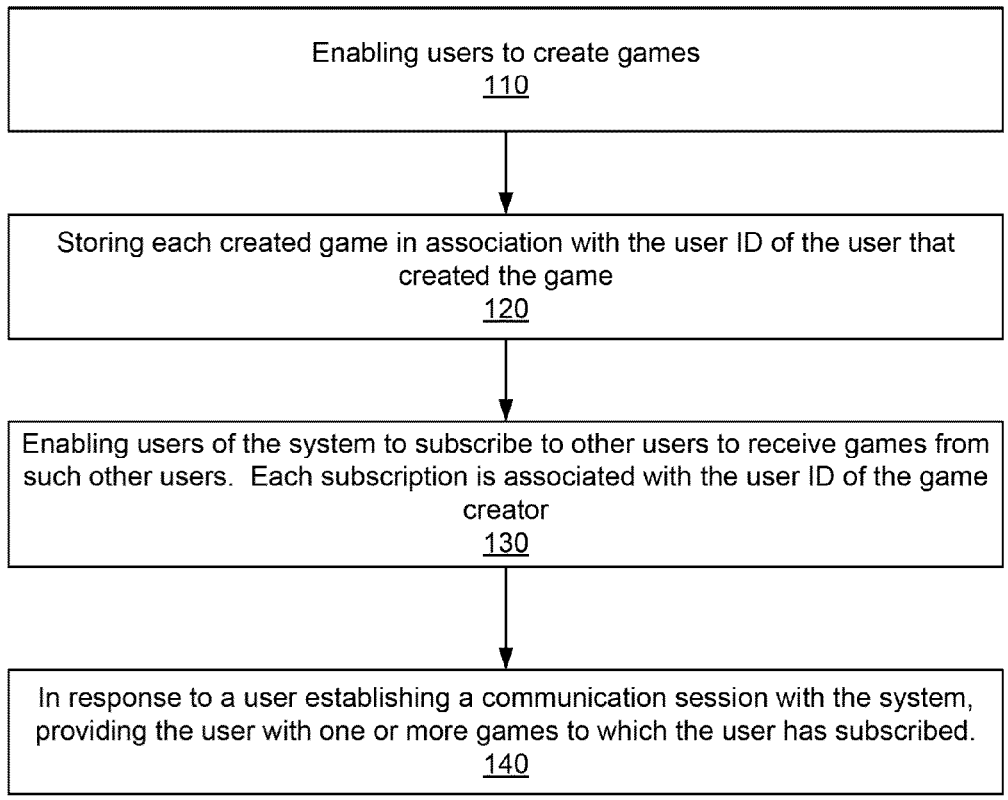
FIG. 1 is a flowchart that illustrates a method for distributing games according to one embodiment of the present invention.

FIG. 1 illustrates a method, in a game distribution system, for distributing games to end users. The game distribution system (hereinafter "the system") enables end users to create games (step 110) and then stores each created game in association with the user ID of the game creator (step 120). The system also enables users to subscribe to or "follow" other users to receive games posted by such other users (step 130).

In a response to a user establishing a communication session with the system, the system sends the user one or more games from game creators to whom the user has subscribed (step 140). For example, if user A subscribes to games from user B, user A will receive games posted by user B. Each subscription is associated with the user ID of the game creator.

Figure 2:
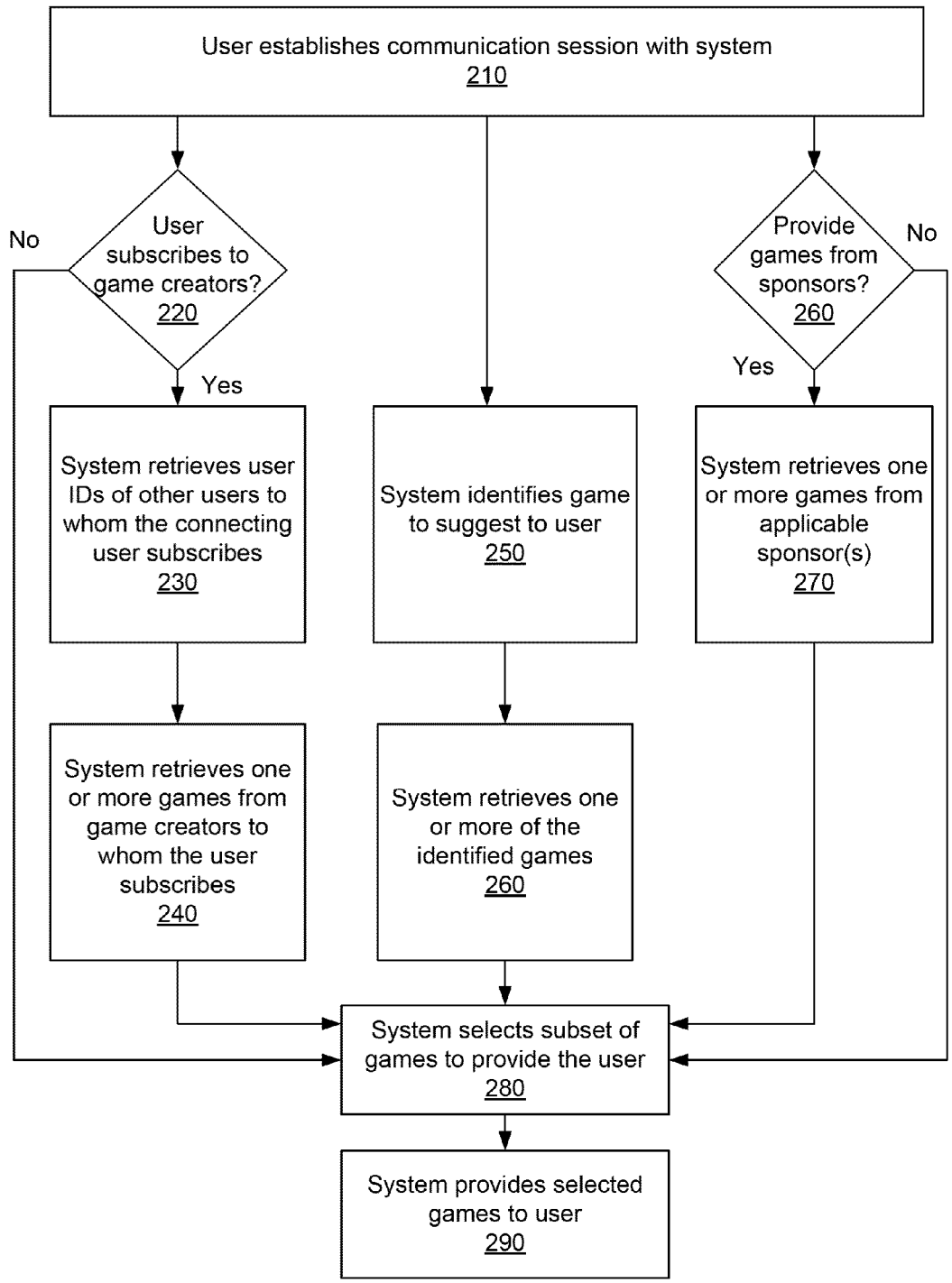
FIG. 2 is a flowchart that illustrates a method for providing games to users in accordance with a further embodiment of the invention.

In a further embodiment of the invention, a user also may receive games that the system thinks may be of interest to the user, as well as games from a sponsor. FIG. 2 illustrates this further embodiment. When a user establishes a communication session (step 210) with a user, the system has a multiple pronged approach for providing games to the user. In one prong, the system determines whether or not the user has subscribed to any game creators (step 220). If so, the system retrieves the user IDs of the game creators to whom the user subscribers (step 230) and retrieves one or more games from such game creators (step 240).

In a second prong, the system identifies games to suggest to the user (step 250) and retrieves one or more of such games (step 260). In performing step 250, the system may use the user's prior game play or interaction with the system, the user's profile (e.g., age, gender, hometown, likes, preferences, etc.), the user's location, and/or events in which the user is participating to identify games that are likely to be or may be of interest to the user. For example, the system may use the type of games the user previously played, the answers the user provided to multiple-choice question games, who the user is following (i.e., subscribing to), and/or who follows the user to identify games that may be of interest to the user. If the user is playing games on a mobile device, the system may determine the user's location and deliver location-specific games. Events in which the user is participating may include watching TV programs, and, in such case, the system may provide the user with games that relate to the TV program as is described in more detail below.

In an optional third prong, the system determines whether there are any games from paid sponsors that should be delivered to the user (step 260). If so, the system retrieves one or more games from applicable sponsor(s) (step 270).

After retrieving games in accordance with steps 240, 260, and 270, the system selects a subset of games to provide to the user (step 280). Selecting a subset may include filtering out games that have been previously presented to the user. The system then provides the selected games to the user (step 290). In one embodiment, games that are similar or related to each other in some fashion are provided in a stream to a user. Those skilled in the art will appreciate that, instead of retrieving more games than needed and selecting a subset in step 280, the system may retrieve the exact amount of games needed in steps 240, 260, and 270.

Figure 3:
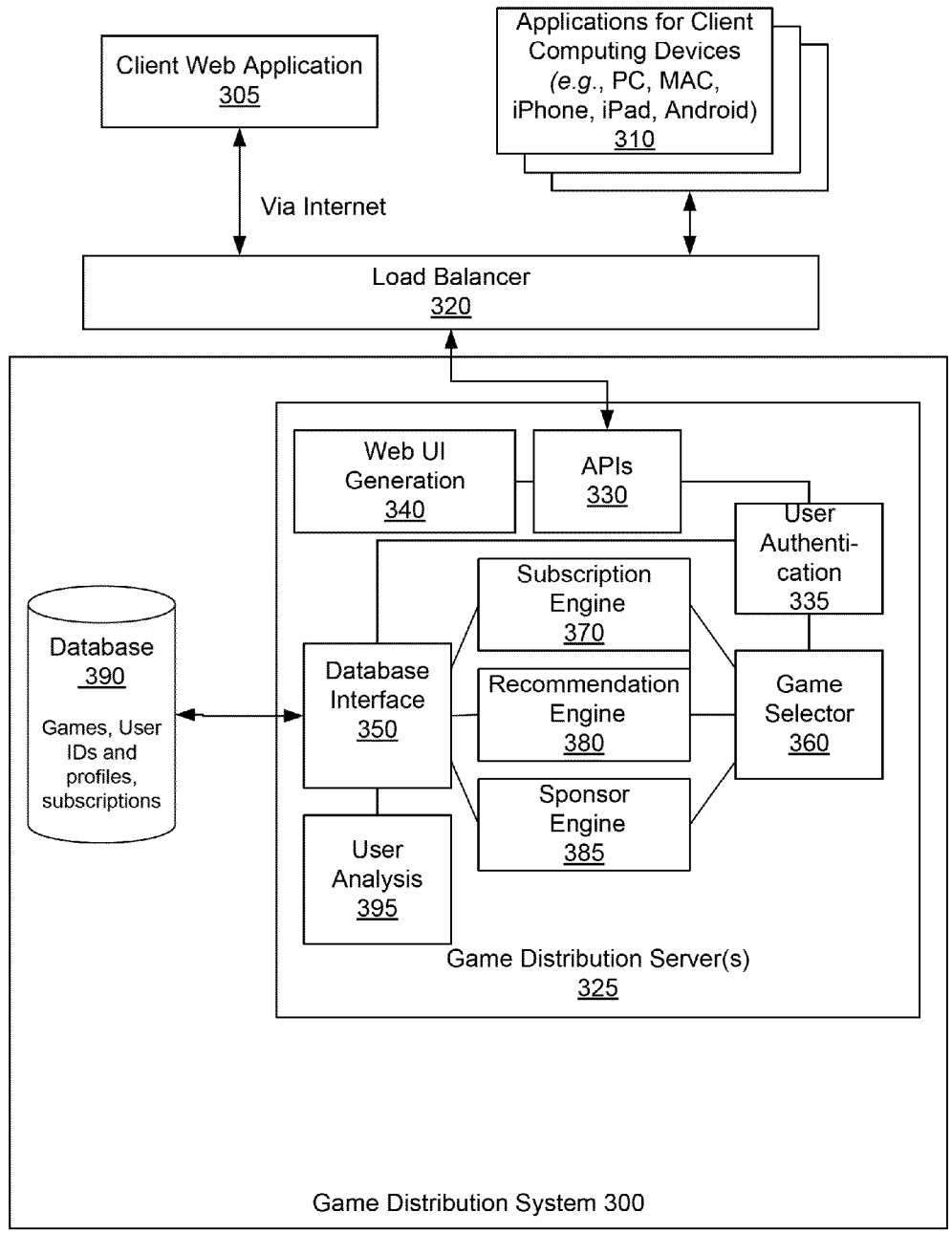
FIG. 3 is a block diagram of an example software architecture for a game distribution system according to one embodiment of the invention.

FIG. 3 illustrates a representative architecture of a game distribution system according to one embodiment of the present invention. FIG. 3 is only an example, and a person of skill in the art would understand that other software architecture may be designed within the scope of the invention. Another design may have more or less or different modules than those depicted.

A user establishes a communication session with Game Distribution System 300 via a client application 305, 310 on a device connected to the Internet. The device may be any computing device capable of running software, such as a computer, a PDA, a mobile phone or other mobile computing device (e.g., iPad), a set-top box, or a TV. The client application may be a web browser 305 or an application 310 specific to a client device (e.g., an application for an iPhone or an Android phone). Client applications 305, 310 provide a user interface via which users can play games and create games (see, for example, FIGS. 4-10).

A Load Balancer 305 balances requests from client applications 305, 310 among Game Distribution Servers 325. A Game Distribution Server 325 includes Web UI Generation module 340, application programming interfaces 330, User Authentication module 335, Game Selector 360, Subscription Engine 370, Recommendation Engine 380, Sponsor Engine 385, and Database Interface 350. These modules are implemented as software code stored in memory and executed by one or more processors.

APIs 330 interface with the various client applications 305, 310. User authentication module 335 authenticates a user based on the login information provided by the user. To authenticate the user, the User Authentication Module 335 communicates with Database 390 to look up user login names and passwords. Web UI Generation module 340 generates web pages for Client Web Application 305. In one embodiment, APIs 330, Web UI Generation 340, and Database Interface 350 include software code that enables a client application 305, 310 to transmit a game created by a user to Game Distribution Server 325 and have such game stored in Database 390. Such code may also be represented by a separate module in Game Distribution Server 325.

In accordance with the method discussed with respect to FIG. 2, Subscription Engine 370 identifies games from game creators to whom the user subscribes, and Recommendation Engine 380 identifies or "recommends" games that may be of interest to the user. Sponsor Engine 385 identifies any sponsored games that should be presented to the user. From the games retrieved by the Recommendation Engine 380, Subscription Engine 370, and Sponsor Engine 385, Game Selector 360 selects a subset of the games to provide a user. Game Selector 360 may filter games previously provided to a user or played by a user.

Database 390 stores games, user IDs and profiles, and, for each user, the user IDs of other users (if any) to whom the user subscribes. Database Interface 350 provides an interface between Database 390 and other modules in Game Distribution Server 325.

In one embodiment, the Game Distribution System 300 also includes User Analysis Module 395. User Analysis Module 395 analyzes the user's game play and interaction with the system (e.g., types of games user plays, who user follows, who follows the user, and/or the user responses to questions) to build an enhanced profile of the user. Such information may be used to provide advertisements or promotions to the user.

Figure 4:
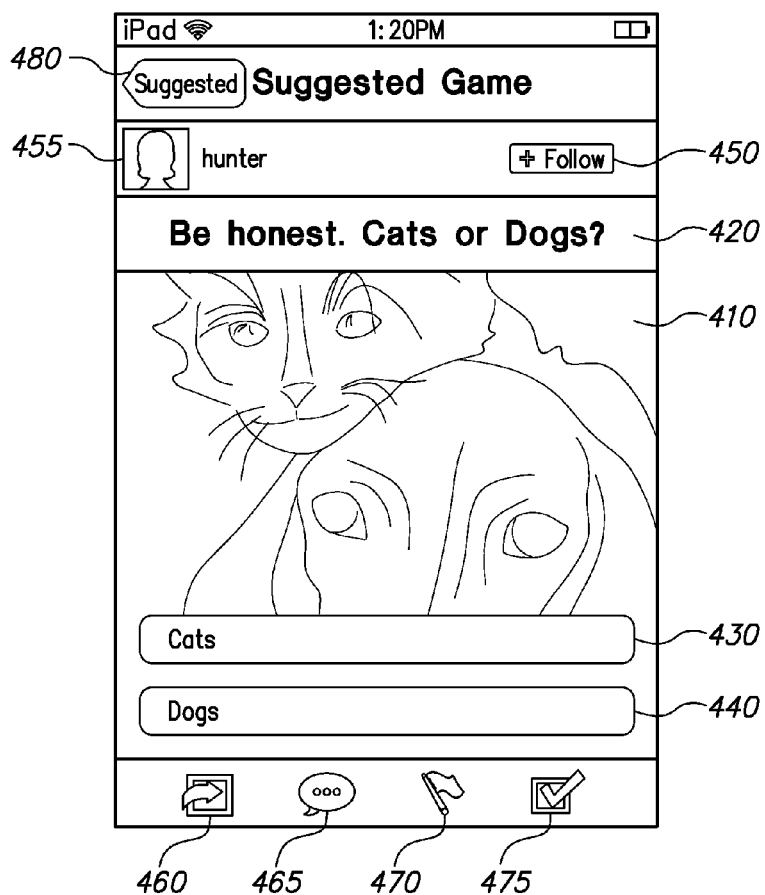
FIGS. 4 and 5 illustrate an example game.
Figure 5:
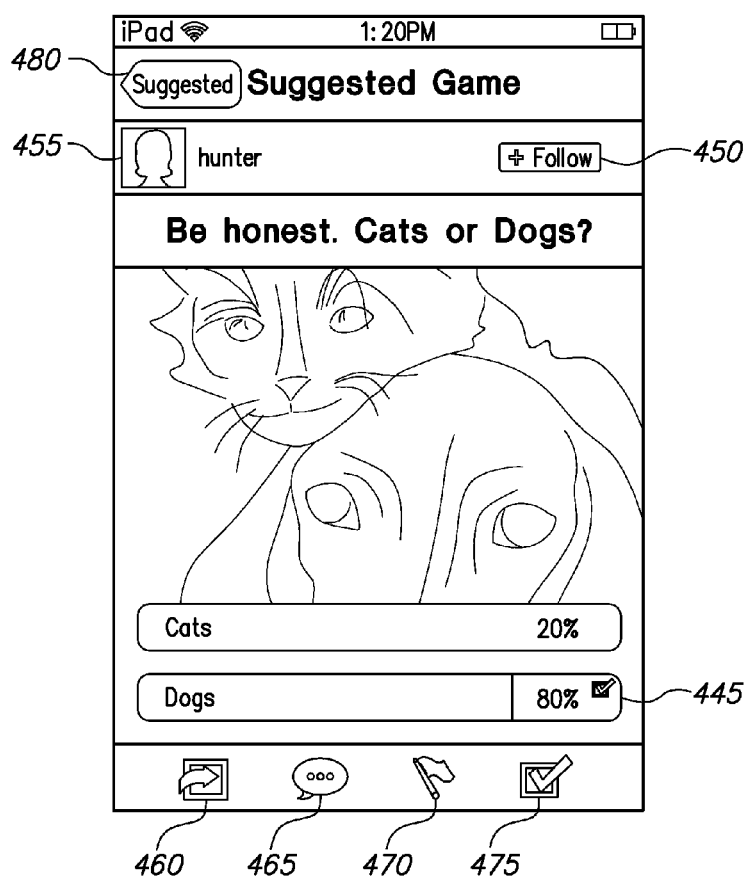

The above-described systems and method may be used to distribute any type of game. In one embodiment, the game is in the form of a multiple-choice question related to a photo. In such case, the user is presented with a photo, a question, and two or more answer options to the question. FIG. 4 illustrates an example of a multiple-choice, photo-based game displayed in a client application on a mobile phone. The client application displays a photo 410, question 420, and answer options 430, 440. FIG. 5 illustrates the user interface after the user has answered the question. The interface displays an indication of how other users voted. Examples of displaying an indication include displaying the percentage of users that voted for a particular answer (as shown in FIG. 5), displaying the actual number of users that voted for a particular answer, and displaying a graphic/symbol that represents the number of users that voted for a particular answer. In the illustrated example, the interface shows that 20% of user voted for "cats" and 80% voted for "dogs." The user that played the game depicted in FIGS. 4 and 5, selected dogs, as indicated by the checkmark box 445 next to the results for "dog." In another embodiment of the invention, next to each answer option prior to a user playing the game is a profile picture of the last user to select such option.

The user interface includes user name and profile picture 455 of the user that created the game. A "follow" button 450 enables the user to subscribe to the user that created the game. By selecting the follow button 450 in the illustrated example, the user will receive other games by the person with the user name "hunter." A "Suggested" button 480 takes the user back to a screen that displays a plurality of suggested or recommended games for the user. The suggested games are the games identified by the Recommendation Engine 380 and/or the Sponsor Engine 385.

Figure 6:
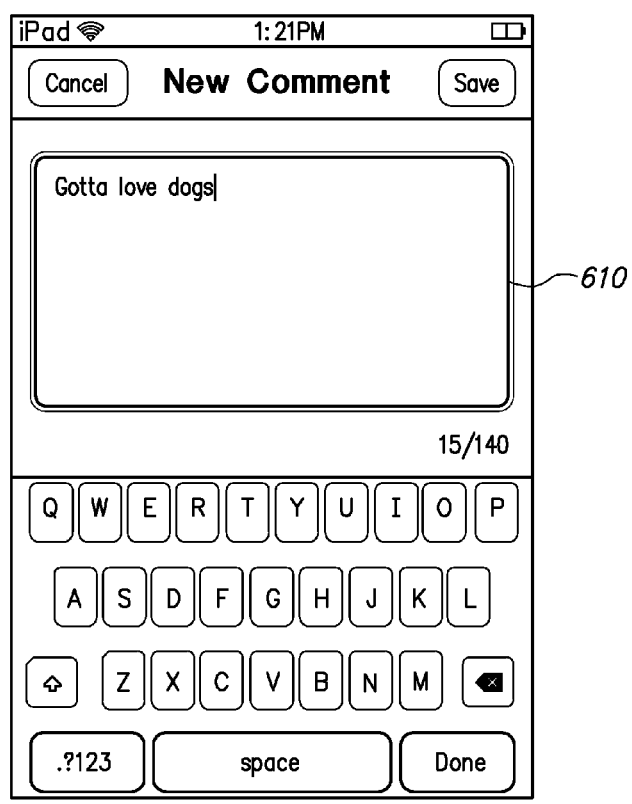
FIG. 6 illustrates an example user interface via which a user can comment on a game.

In the present example, the user interface also includes icons 460, 465, 470, and 475. Icon 460 is a link that enables a user to share a game with others via email, SMS message, the game distribution system platform, or a social media application, such as FACEBOOK or TWITTER. Icon 465 is a link that enables a user to enter a comment about the game. In this example, when a user clicks on icon 465, the user interface shown in FIG. 6 is displayed. The user can type a comment in box 610. The user interface includes a link (not shown) that a user can click on to be taken to a page where a user can see all other users' comments.

Icon 470 enables a user to flag a game that he thinks contains inappropriate content. Icon 475 enables to see the list of users, identified by user name, that voted for each answer option.

Certain games may have time limits. In such case, the game screen may display a progress bar (not shown) that indicates the amount of time the user has left to play the game.

Figure 7:
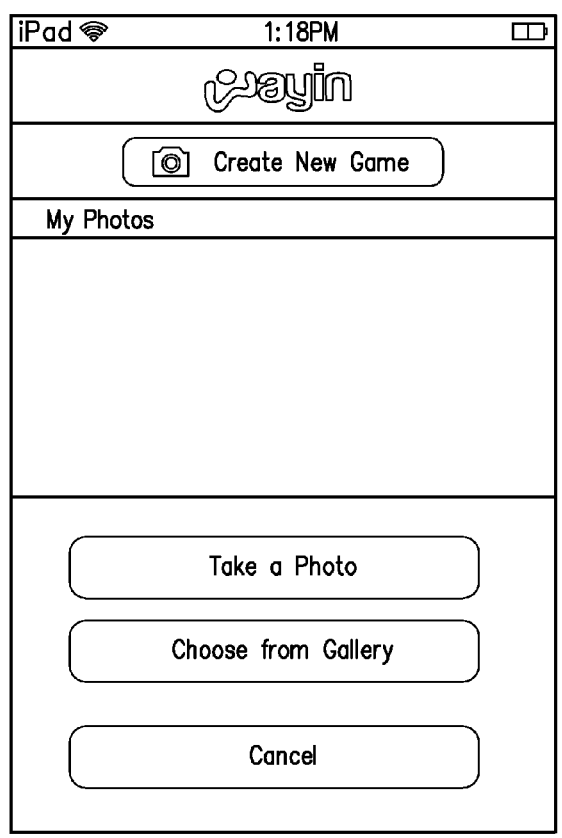
FIGS. 7-10 illustrate an example user interface via which a user can create a game.
Figure 8:
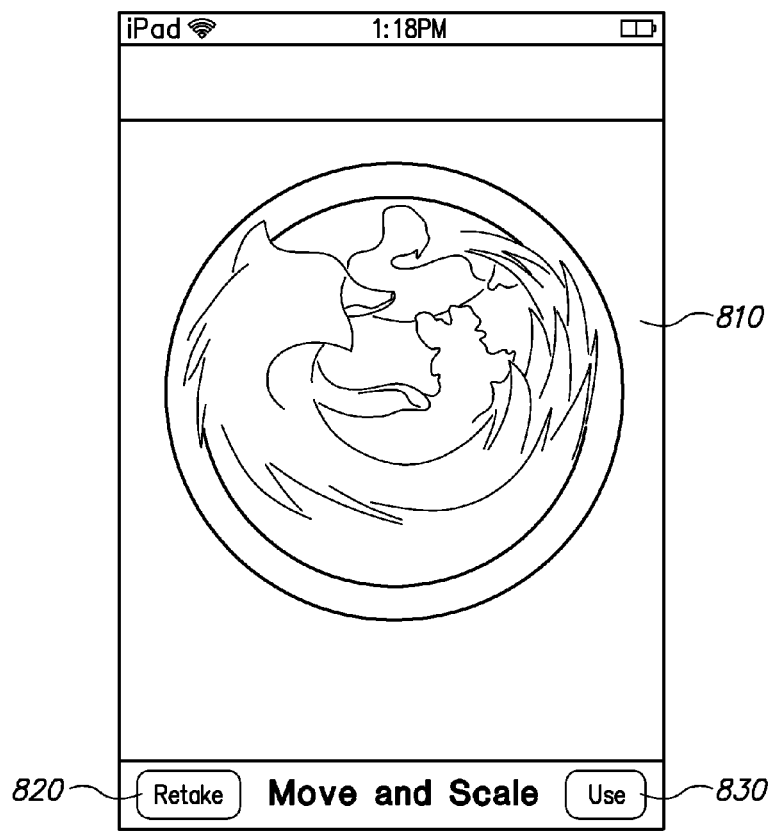
Figure 9:
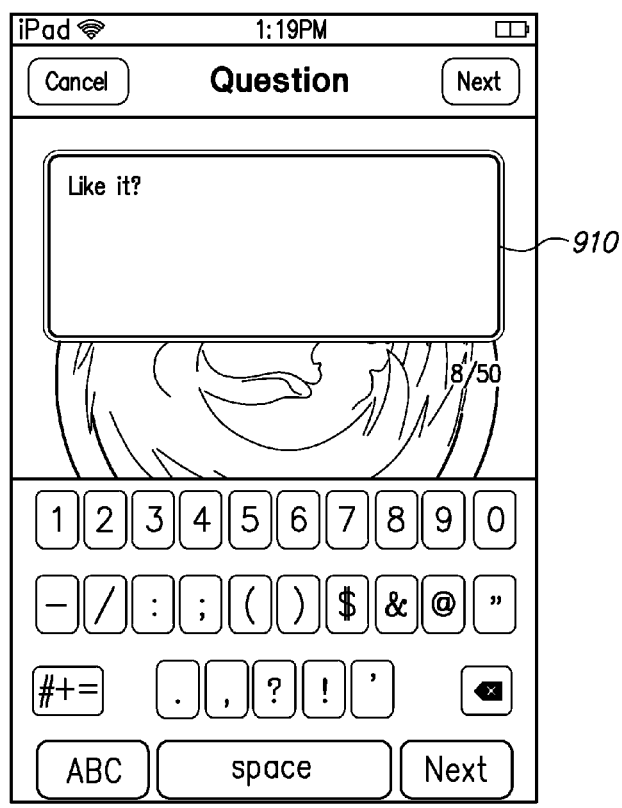
Figure 10:
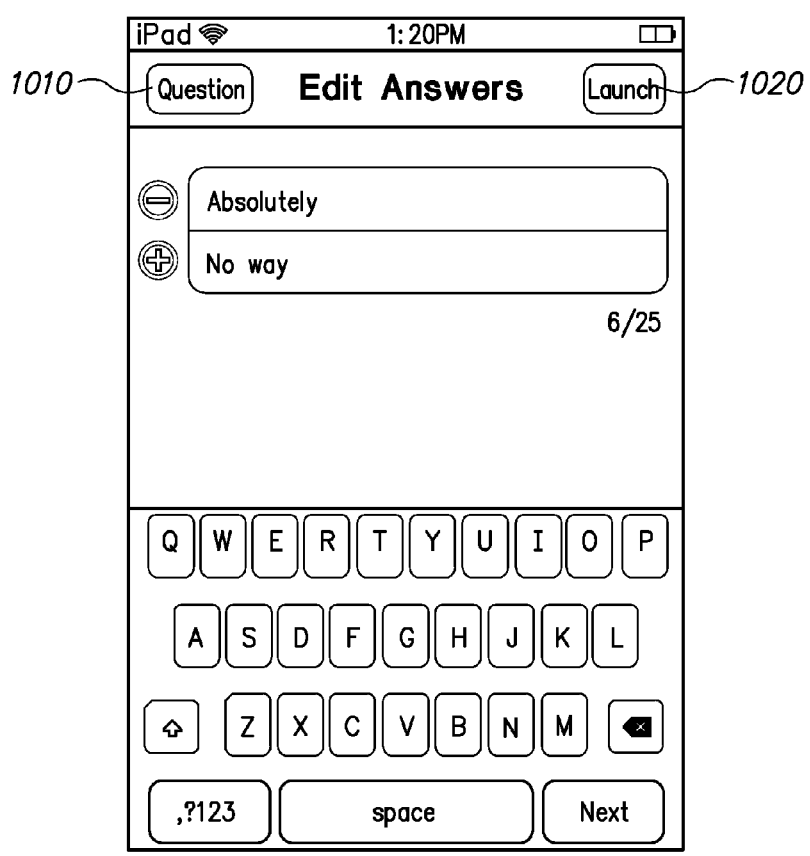

As discussed above, client applications in the game distribution system also include an interface that enables end users to create games. FIGS. 7-10 illustrate an example of a user interface that enables a user to create a multiple-choice, photo-based game. FIG. 7 illustrates a screen where a user can select a photo for the game. In this screen, a user can take a photo for the game or choose one from a photo gallery on the user's mobile device. FIG. 8 illustrates a screen where user can move and scale the photo 810, elect to retake the photo 820, or confirm that he will use the photo 830. By selecting the "Use" button 830, a user is taken to the screen illustrated in FIG. 9, where the user types the question for the game. The question is typed into box 910. The "Next" button 920 takes the user to the next screen in the development process, which is illustrated in FIG. 10. FIG. 10 is the screen which the user types the answer options. The "Question" button 1010 enables a user to go back to the question screen in FIG. 9. The "Launch" button 1020 launches the game in the game distribution system, which will distribute the game to other users in accordance with the methods described with respect to FIGS. 1-3. In the game distribution system 300 illustrated in FIG. 3, the game is stored in Database 390 when the user launches the game.

Figure 11:
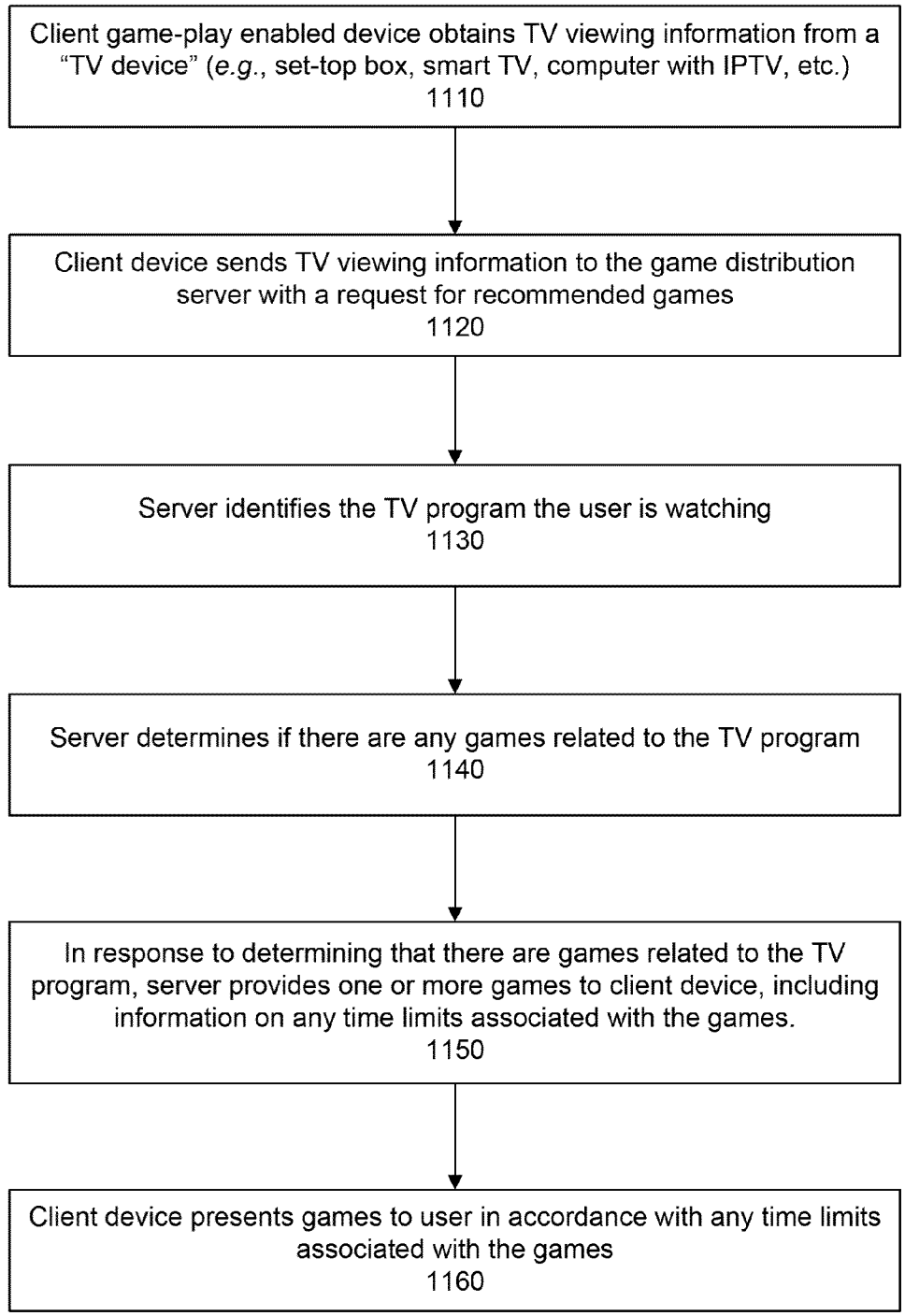
FIG. 11 is a flowchart illustrates a method for distributing TV-related games to a game-play enabled client device according to one embodiment of the invention.

FIG. 11 illustrates a further embodiment of the invention in which the game distribution system identifies a TV program a user is watching and provides the user with games related to the TV program. In this embodiment, a client game-play enabled device (e.g., a device running client applications 305 or 310) obtains TV viewing information from a "TV device" (step 1110). As used herein, a "TV device" is any device capable of providing TV programming to a video display, such as, for example, a set-top box, smart TV, and a computer with IPTV.

There are several ways in which a client game-play enabled device may be configured to obtain TV viewing information. In one embodiment, the client device goes through a one-time pairing process in which the client device is authenticated by a TV content provider (e.g., cable TV or satellite TV company) and paired with a particular TV device. After the client device is paired, it can communicate with the TV device and request TV viewing information from the TV device. Each cable or satellite provider usually has its own procedures for pairing devices with its set-top boxes, as well as APIs for interrogating set-top boxes. Client applications in the game distribution system may be configured to communicate with any set-top box in accordance with the applicable API. Also, client applications may be configured to probe all IP addresses on a local area network (LAN) to ascertain whether or not there is a compatible TV device on the LAN with which the client application can communicate. Alternatively, in cases where the client device is unable to establish a communication session with a TV device, the client device may be configured to capture an audio or video stream from a TV device (i.e., record the audio or video stream). In such case, the game distribution system analyzes the captured audio or video to determine if a user is watching a TV program. The game distribution system may send the captured audio or video to an external service (e.g., SHAZAM) to analyze the content.

If a client device is able to establish a communication session with a TV device, examples of the type of information a client device may be able to obtain from the TV device include the title of the TV program the user is watching, the channel the user is watching, how far into the program the user has watched, channel change events, a list of programs the user has set to record, a list of programs the user has recorded, past programs viewed via the TV device, and metadata related to the TV programs (e.g., actors, genre, year made, etc.). In one embodiment, the TV device provides the client device with the title of the current program the user is watching and then notifies the client device of any channel change events.

After the client device obtains TV viewing information from a TV device, it sends the information to a game distribution server (e.g., server 325) with a request for recommended games (step 1120). The game distribution server uses the TV viewing information to identify the TV program the user is watching (step 1130). As used herein, "TV program" includes network and cable TV programs, movies, and other forms of video entertainment, information, or instruction that may viewed on a video display. The server then determines if there are any games related to the TV program (step 1140). In response to determining that there are games related to the TV program, the server provides one or more of such games to the client device (step 1150). The server also may include additional instructions or information that pertain to the presentation and play of the games. For example, certain games may have time limits, and, for such game, the server includes information on the time limits. The client device presents TV-related games to the user in accordance with any time limits associated with the games (step 1160).

Figure 12A:
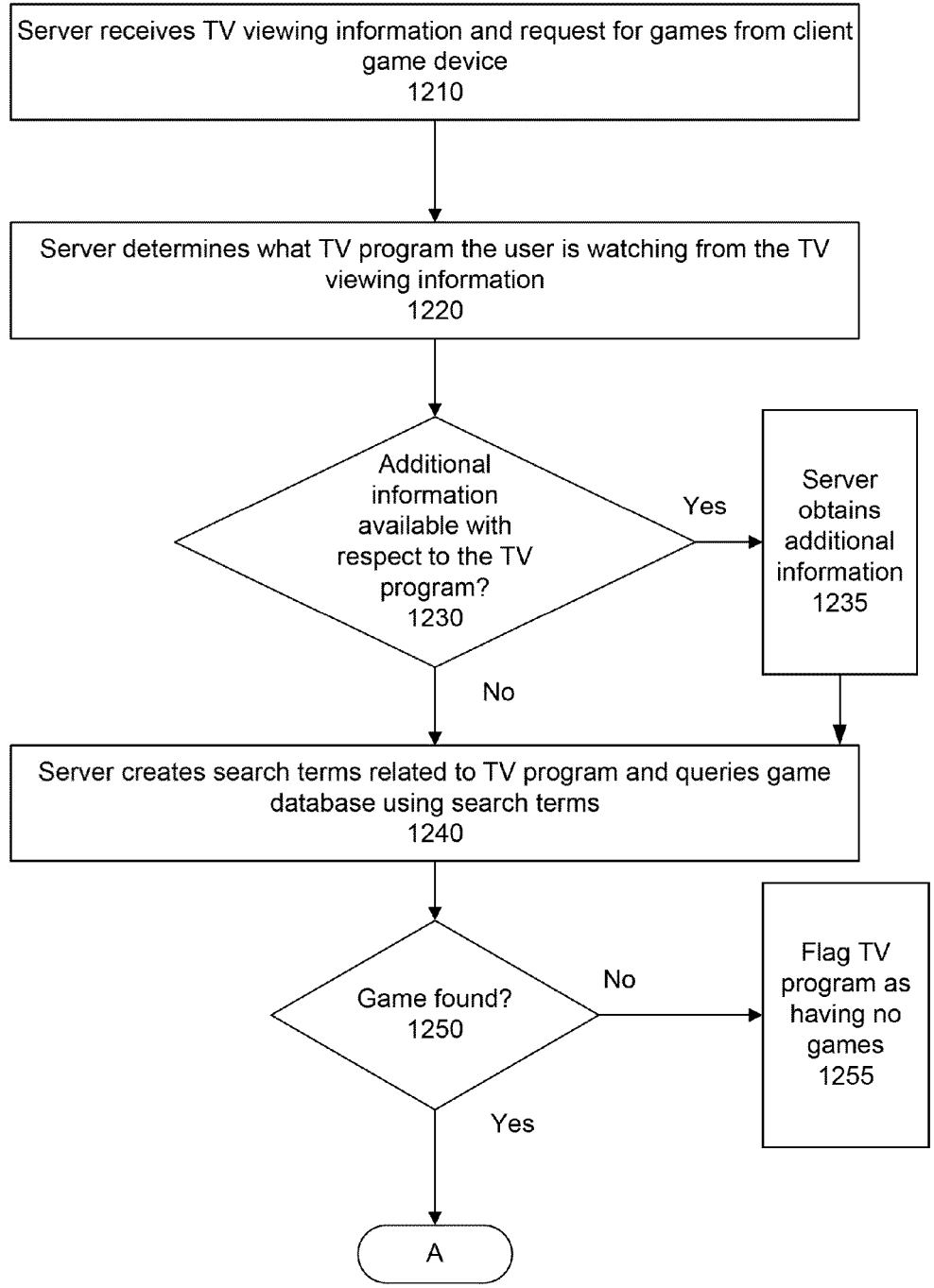
FIG. 12 is a flowchart that illustrates the operation of the game distribution server in providing TV-related games according to one embodiment of the present invention.
Figure 12B:
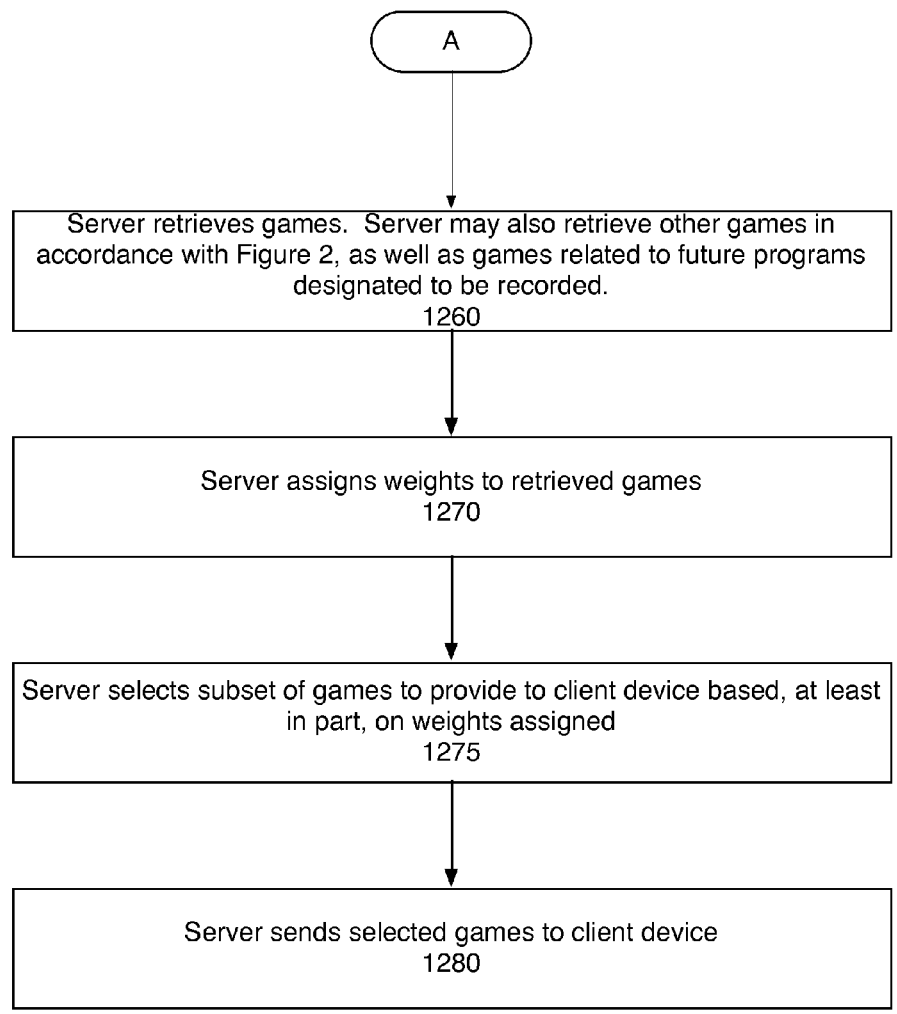

FIG. 12 illustrates the operation of the game distribution server in providing TV-related games according to one embodiment of the present invention. The game distribution server receives TV viewing information and a request for games from a client game-play enabled device (step 1210). The server uses the TV viewing information to identify the TV program the user is watching (step 1220). In some cases, the TV viewing information includes the title of the TV program, and, thus, the server can easily identify the TV program. If the client device provides the server with an audio or video stream it captured, then the audio and/or video stream is analyzed to see if the stream maps to a TV program. This analysis may be performed by the server, or the server may send a request to an external program or service (e.g., SHAZAM) to perform such analysis.

After identifying the TV program the user is watching, the server determines if there is any desired additional information available with respect to the TV program. Such additional information may be used to perform a more robust search for related games. If desired additional information is available, the server obtains the additional information (step 1235). For example, closed captioning information may be available for a TV program. If so, the server may send a request for the closed caption information from a closed caption information provider. The server also may look up other information related to the TV program, such as the actors' names and the genre category. Such additional information may be obtained from an external service.

The server creates search terms related to the TV program (and any additional information retrieved about the TV program) and queries a game database (e.g., database 390) for games (1240). For example, the server may use the TV program's title or the TV program's actors' names to search the games database. If no games adequately satisfy the search criteria, the TV program is optionally flagged as having no games. This enables content providers for the game distribution system to track the TV programs for which games are needed. For games that are specific to a TV program, the games database may store such games in association with the title the of the TV program.

The games also may be stored in association with any time limits for playing the games. If the TV viewing information includes how far a user has progressed into a program, the server may use such information in the search terms so that only games that the user can still play will be retrieved.

If there are games that sufficiently satisfy the search criteria, the server retrieves the games (step 1260). The server may also retrieve other games that may be of interest to the user, as described with respect to FIG. 2. The server assigns weights to retrieved games (step 1270). The weight assigned may depend on a variety of factors. On the client user interface, there may be a TV games section. If this is the case, a high weight would be assigned to TV games. Also, if a game is deemed particularly relevant to a TV program a user is currently watching, the game may be assigned a higher weight than other retrieved games. For example, if the game is a question related to a TV program the user is watching and the game must be played before the user reaches a certain point in the TV program, such game likely would be assigned a higher weight than most of the other retrieved games.

The server selects a subset of retrieved games to provide client devices based, at least in part, on weights assigned (step 1275). The server then sends the selected games to the client device (step 1280).

In addition to searching for games related to a TV program a user is currently watching, the server may use TV viewing information sent by the client device to find other games to suggest to the user. For example, suggested games that the server delivers to the client may include one or more of the following:

1. Games related to a program a user has set to record on a DVR or other similar device. In this embodiment, the TV viewing information sent to the server includes a list of programs that are designated to be recorded by the TV device.

2. Games related to programs the user has watched in the past. As the server receives information about a user's TV viewing habits, it may add such information to the user's profile. In addition, or alternatively, the TV viewing information obtained from a TV device by a client device may include the user's recent viewing history.

3. Games that have been played or that are subscribed to by other users who watch the same program(s) the user watches. In such embodiment, the recommendation engine 385 may use collaborative filtering to identify such games.

In many households, there are multiple TV devices connected to the same LAN. In one embodiment, the TV viewing information provided by a client device includes TV viewing information from all the TV devices on the same LAN. For example, if there are three set-top boxes connected to the same home network, the client device probes all three set-top boxes for TV information. Also, there may be multiple gameplay enabled client devices connected to the same LAN as the set-top boxes (or other TV devices). In such case, the server may send some of the same games to all the client devices on the LAN in attempt to get the household to join in on games together. For example, if Mom and Dad are in one room watching TV, and the kids are in another room watching the same program, the server may suggest the same TV-related games to all the client devices in the household so that the parents and kids can join in on games together.

In certain embodiments, the client device may provide the server with GPS information so that the server can ascertain the location of the client device. The server may use the location information to search for TV-related games or other games to suggest to the user.

An example of a game related to a TV program is a polling game that asks a user a question related to what will happen next in a TV program. To enable such games for users who watch recorded TV programs (as opposed to live TV), the TV viewing information obtained by the client specifies how far into the program the user has progressed, as it only makes sense to allow the user to submit an answer before the user has reached the point in the program to which the question pertains. In one embodiment, after the time for playing the game expires, the user cannot play the game, but can see the results of the game.

In one embodiment, games related to a particular TV program may be packaged together in a "game event." A game event is a collection of games. Games are published to events, and an event has a start time or an end time. In response to receiving TV viewing information from a client device, the server may search for game events pertaining to the TV program.

In one embodiment, the user interface provided by the client game application on the client device includes a guide obtained from the TV device or downloaded from a cable or satellite TV provider's network. The guide displays upcoming TV programs. A user can select a program on the guide to submit a game for a TV program.

Figure 13:
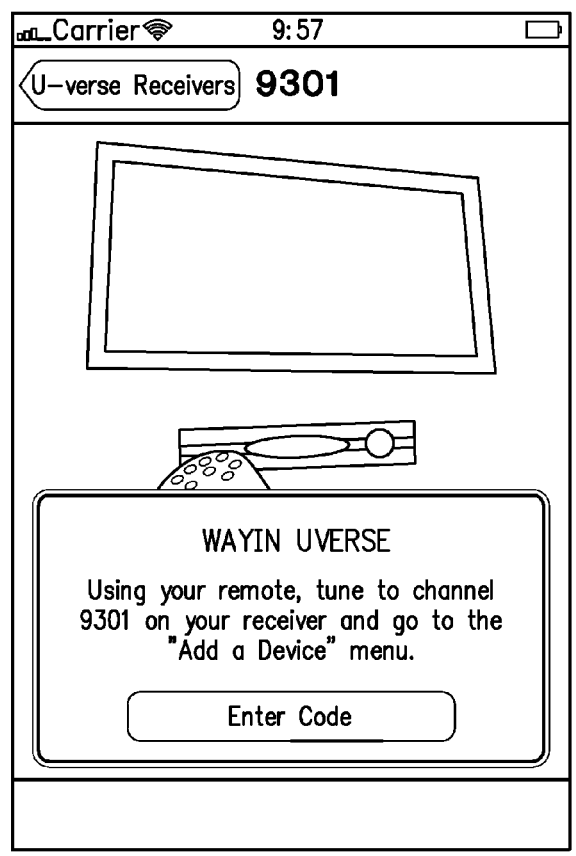
FIGS. 13-16 are screenshots that illustrates an example embodiment of the invention related to providing TV-related games to a user.
Figure 14:
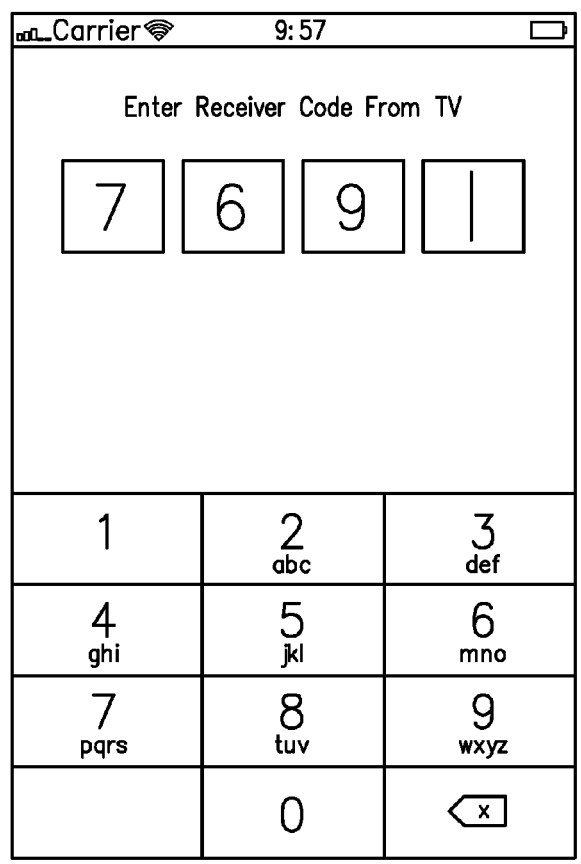

FIGS. 13-16 are screen shots that illustrate an example embodiment of the invention. These screen shots are merely examples, and the invention is not limited to the illustrated embodiments. FIG. 13 illustrates a client user interface screen that a user may see in response to the client device detecting, for the first time, a compatible TV device on a local area network. This screen provides the user with instructions for pairing the client device with the compatible TV device (in this case a UVERSE set-top box). FIG. 14 illustrates a screen in which a user is prompted to enter a receiver code as part of the pairing process.

Figure 15A:
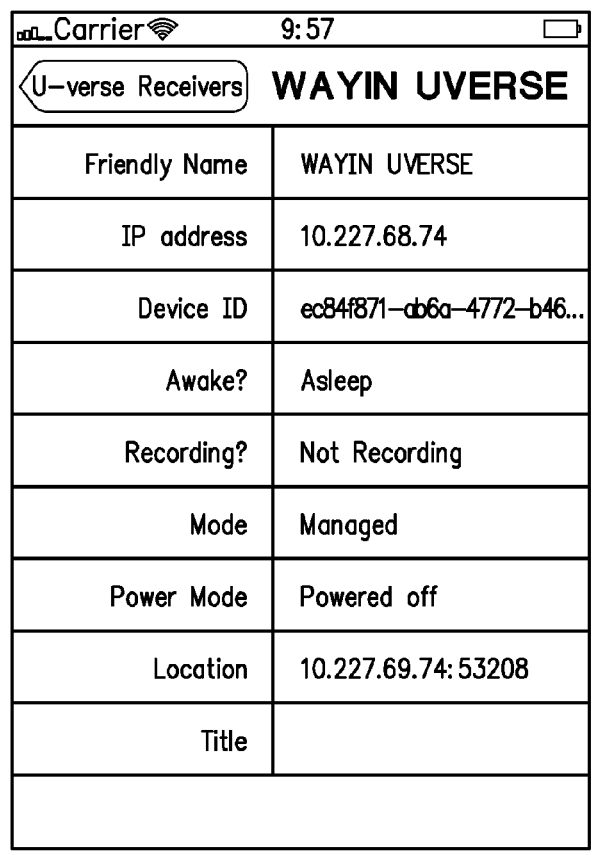
Figure 15B:
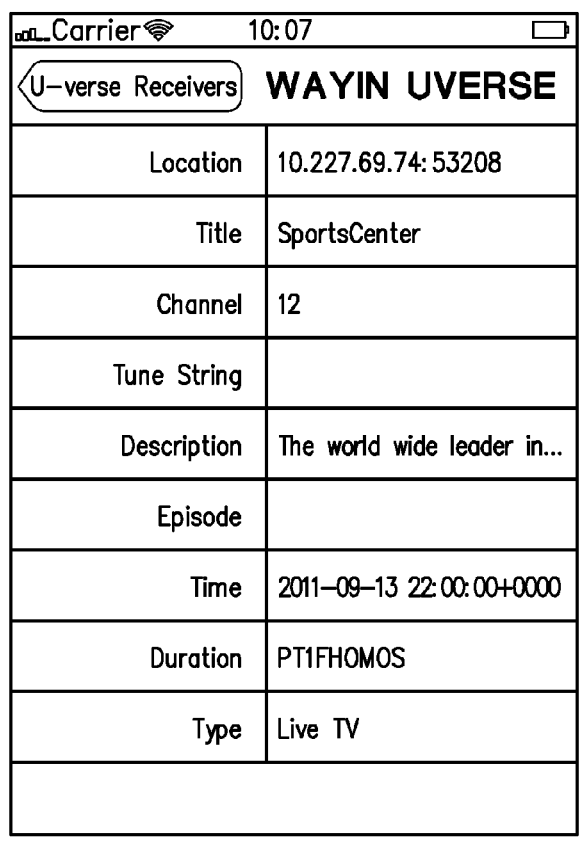

After a client device is paired with a TV device, the client application may display, on the client device, summary information related to the TV device. FIG. 15a illustrates a portion of a screen with such summary information. In FIG. 15a, the information indicates that the user is not watching TV and the TV device is not currently recording any information. FIG. 15b also illustrates a portion of a screen with such summary information. The information in FIG. 15b indicates a user is watching a live TV program titled "Sports Center" on channel 12. The information illustrated in FIGS. 15a-15b is an example of the type of information the client device provides to the game distribution server.

Figure 16:

FIG. 16 illustrates an alert (on the client device) that notifies a user that there are new games available for a TV program titled "First 48." In one embodiment, such an alert appears in response to the server (i) detecting that the user is currently watching the program "First 48" and (ii) finding new games related to such program.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for distributing games to a user performed by a game distribution system that includes game-play enabled client devices and a server for providing games to the client devices, the method comprising:

obtaining TV viewing information from a device that provides TV programming to a user, wherein the TV viewing information includes information on future TV programs designated to be recorded by the device;
identifying a TV program that the user is watching from the TV viewing information;
searching for games related to the TV program the user is watching;
in response to finding games related to the TV program the user is watching, providing at least one of said games to the user on the client device, wherein said game(s) are provided while the user is watching the TV program; and
identifying additional games to present to the user based on future TV programs designated to be recorded by the device.

2. The method of claim 1, wherein a game provided to the user includes a question related to the TV program.

3. The method of claim 2, wherein the TV viewing information includes how far into the TV program the user has progressed, and the game provided to the user includes a question related to the part of the TV program the user is currently watching.

4. The method of claim 3, wherein the game provided to the user has a time limit for play and the user is able to submit an answer to the question only prior to the expiration of the time limit.

5. The method of claim 4, wherein a user can see how other users answered the question either in response to the user submitting an answer to the question or in response to the expiration of the time limit, whichever comes first.

6. The method of claim 2, wherein the game provided to the user has a time limit for play and the user is able to submit an answer to the question only prior to the expiration of the time limit.

7. The method of claim 6, wherein a user can see how other users answered the question either in response to the user submitting an answer to the question or in response to the expiration of the time limit, whichever comes first.

8. The method of claim 2, wherein the TV viewing information includes the TV program title.

9. The method of claim 8, wherein the TV viewing information includes any channel change events.

10. The method of claim 1, wherein a game-play enabled client device obtains the TV viewing information and provides the TV viewing information to the server, which performs the search for games related to the TV program.

11. The method of claim 10 wherein the client device is paired with the device that provides TV programming information to the user ("the TV device"), and, in response the paired client device being able to communicate with the TV device over a local area network, the client device establishes a communication session with the TV device to obtain TV viewing information.

12. The method of claim 10, wherein obtaining the TV viewing information comprises capturing, by the client device, an audio stream from the device that provides TV programming information to the user.

13. The method of claim 10, wherein obtaining the TV viewing information comprises capturing, by the client device, a video stream from the device that provides TV programming information to the user.

14. The method of claim 10, wherein the client devices also provides the server with GPS data, and the server also uses the location of the client device to search for games.

15. A computer program embodied on a non-transitory computer-readable medium and comprising code, that, when executed by a client-server computer system, enables the computer system to perform the following method:
obtaining TV viewing information from a device that provides TV programming to a user, wherein the TV viewing information includes information on future TV programs designated to be recorded by the device;
identifying a TV program that the user is watching from the TV viewing information;
searching for games related to the TV program the user is watching;
in response to finding games related to the TV program the user is watching, providing at least one of said games to the user on the client device, wherein said game(s) are provided while the user is still watching the TV program; and
identifying additional games to present to the user based on future TV programs designated to be recorded by the device.

16. The computer program of claim 15, wherein a game provided to the user includes a question related to the TV program.

17. The computer program of claim 16, wherein the TV viewing information includes how far into the TV program the user has progressed, and the game provided to the user includes a question related to the part of the TV program the user is currently watching.

18. The computer program of claim 17, wherein the game provided to the user has a time limit for play and the user is able to submit an answer to the question only prior to the expiration of the time limit.

19. The computer program of claim 18, wherein a user can see how other users answered the question either in response to the user submitting an answer to the question or in response to the expiration of the time limit, whichever comes first.

20. The computer program of claim 16, wherein the game provided to the user has a time limit for play and the user is able to submit an answer to the question only prior to the expiration of the time limit.

21. The computer program of claim 20, wherein a user can see how other users answered the question either in response to the user submitting an answer to the question or in response to the expiration of the time limit, whichever comes first.

22. The computer program of claim 16, wherein the TV viewing information includes the TV program title.

23. The computer program of claim 21, wherein the TV viewing information includes any channel change events.

24. The computer program of claim 15, wherein a game-play enabled client device obtains the TV viewing information and provides the TV viewing information to the server, which performs the search for games related to the TV program.

25. The computer program of claim 24 wherein the client device is paired with the device that provides TV programming information to the user ("the TV device"), and, in response the paired client device being able to communicate with the TV device over a local area network, the client device establishes a communication session with the TV device to obtain TV viewing information.

26. The computer program of claim 15, wherein obtaining the TV viewing information comprises capturing, by the client device, an audio stream from the device that provides TV programming information to the user.

27. The computer program of claim 15, wherein obtaining the TV viewing information comprises capturing, by the client device, a video stream from the device that provides TV programming information to the user.

28. The computer program of claim 15, wherein the client devices also provides the server with GPS data, and the server also uses the location of the client device to search for games.

\* \* \* \* \*